US 6,538,677 B1

(12) United States Patent
Thompson et al.

(10) Patent No.: US 6,538,677 B1
(45) Date of Patent: Mar. 25, 2003

(54) APPARATUS AND METHOD FOR GRAY LEVEL PRINTING

(75) Inventors: John R. Thompson, Webster, NY (US); Yee S. Ng, Fairport, NY (US); Eric Zeise, Pittsford, NY (US); Hwai-Tzuu Tai, Rochester, NY (US); Eric C. Stelter, Pittsford, NY (US)

(73) Assignees: Heidelberger Druckmaschinen AG, Heidelberg, DE (US); NexPress Solutions LLC, Rochester, NY (US)

( * ) Notice: Subject to any disclaimer, the term of this patent is extended or adjusted under 35 U.S.C. 154(b) by 0 days.

(21) Appl. No.: 09/854,636

(22) Filed: May 14, 2001

Related U.S. Application Data
(60) Provisional application No. 60/204,698, filed on May 17, 2000.

(51) Int. Cl.[7] .................................................. B41J 2/45
(52) U.S. Cl. ........................ 347/131; 347/140; 358/1.9; 358/3.1
(58) Field of Search ................................ 347/131, 237, 347/140; 358/1.9, 298, 3.09, 3.1

(56) References Cited

U.S. PATENT DOCUMENTS

| | | |
|---|---|---|
| 4,473,029 A | 9/1984 | Fritz et al. |
| 4,531,832 A | 7/1985 | Kroll et al. |
| 4,546,060 A | 10/1985 | Miskinis et al. |
| 4,602,863 A | 7/1986 | Fritz et al. |
| 4,680,645 A | 7/1987 | Dispato et al. |
| 4,701,811 A | 10/1987 | Moriguchi et al. |
| 4,868,587 A | 9/1989 | Loce et al. |
| 5,198,910 A | 3/1993 | Ng et al. |
| 5,200,831 A | 4/1993 | Tai |
| 5,258,849 A | 11/1993 | Tai et al. |
| 5,260,807 A | 11/1993 | Tai et al. |
| 5,300,960 A | 4/1994 | Pham et al. |
| 5,376,492 A | 12/1994 | Stelter et al. |
| 5,604,527 A | 2/1997 | Ng et al. |
| 5,732,311 A | 3/1998 | May et al. |
| 5,739,841 A | 4/1998 | Ng et al. |
| 5,754,309 A * | 5/1998 | Chen et al. .................. 345/597 |
| 5,903,713 A * | 5/1999 | Daels et al. .................. 358/1.9 |
| 5,948,585 A | 9/1999 | Gady et al. |
| 6,014,226 A * | 1/2000 | Harrington et al. .......... 358/1.9 |
| 6,166,757 A * | 12/2000 | Murano ...................... 347/240 |

* cited by examiner

Primary Examiner—Joan Pendegrass

(57) ABSTRACT

A copier or a printer 10 includes a controller 16/30 with a rendering algorithm that groups sets of adjacent pixels into sets of adjacent cells where each cell corresponds to a halftone dot of an image. The algorithm operates in conjunction with a gray scale printhead 22. In sending data to the printhead, the controller 16 parses a scanned image and set the exposure for each pixel in accordance with a growth and density program. The algorithm selectively grows halftone dots from zero size to a desired size equal to or less than a maximum size. It repeats this step for the rest of the pixels until the cell is at its desired size and at an initial density. If a higher density is desired, the algorithm selectively adjusts the fully grown cells by sequentially increasing the level of exposure of each pixel in the cell. The image is developed with developer including a hard magnetic carrier and toner.

21 Claims, 11 Drawing Sheets

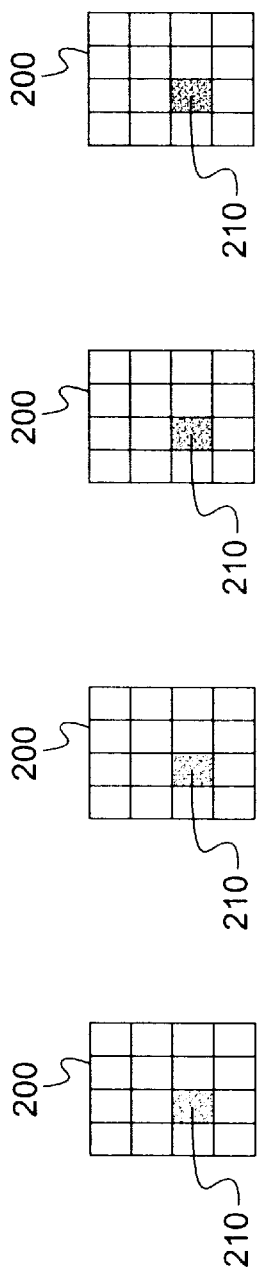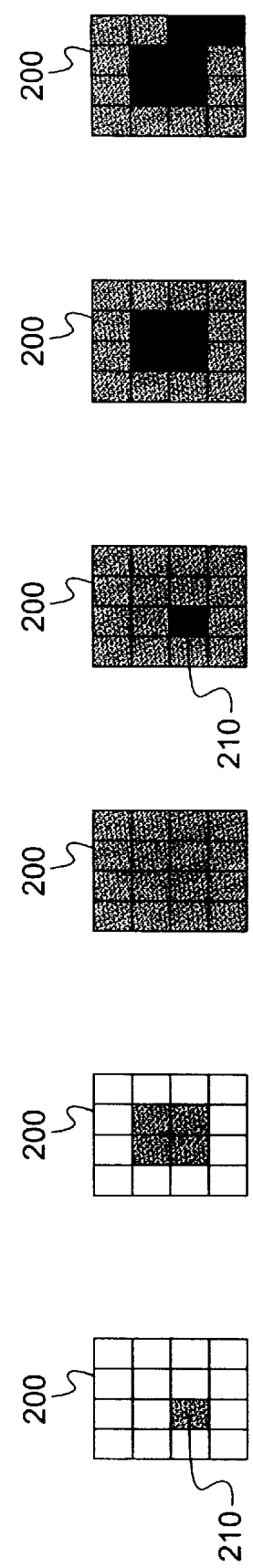

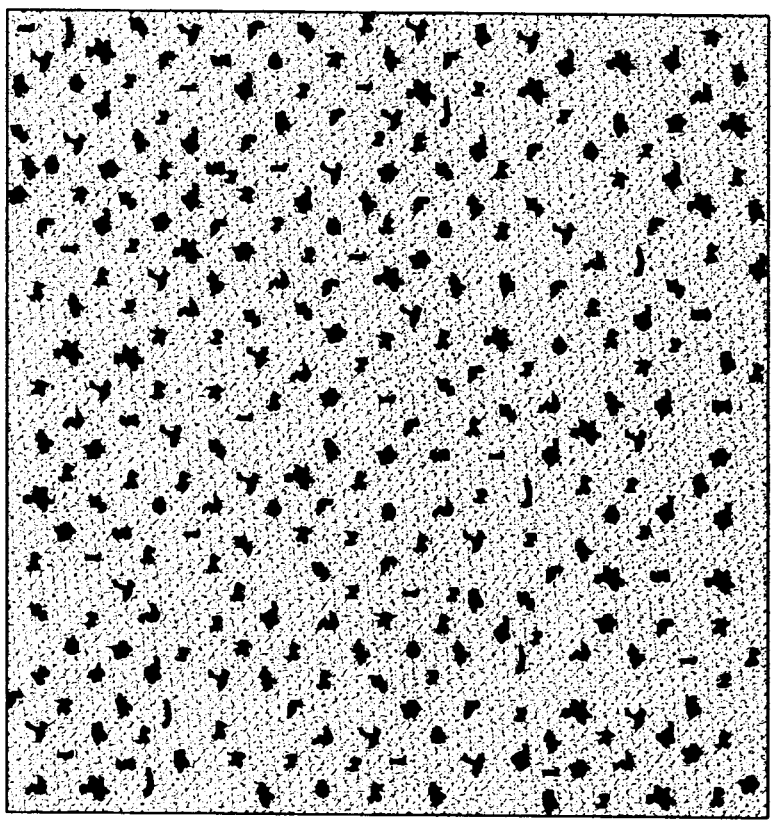
IS92p
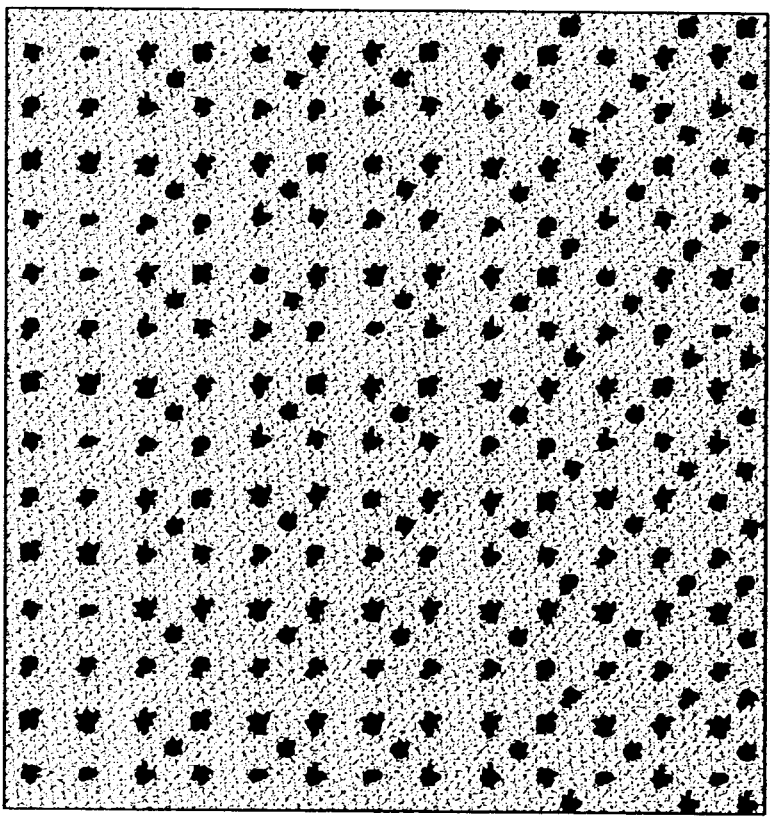
DIGISOURCE 9110
FIG. 4

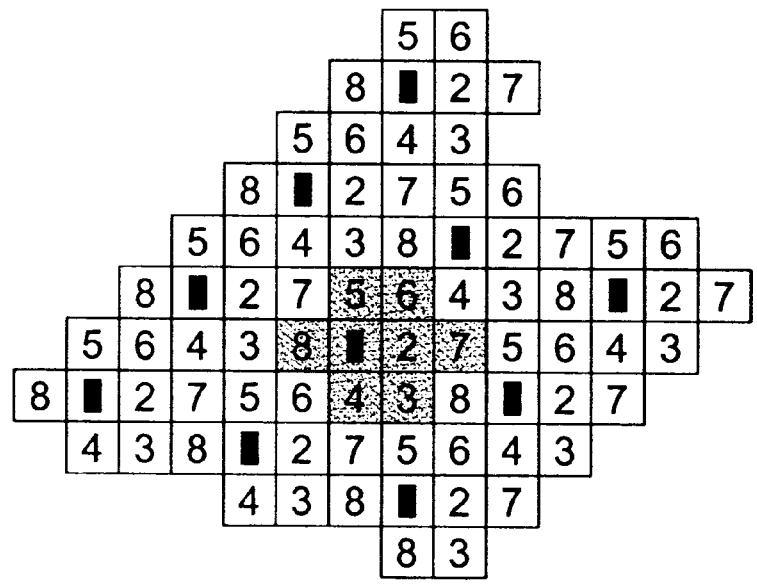
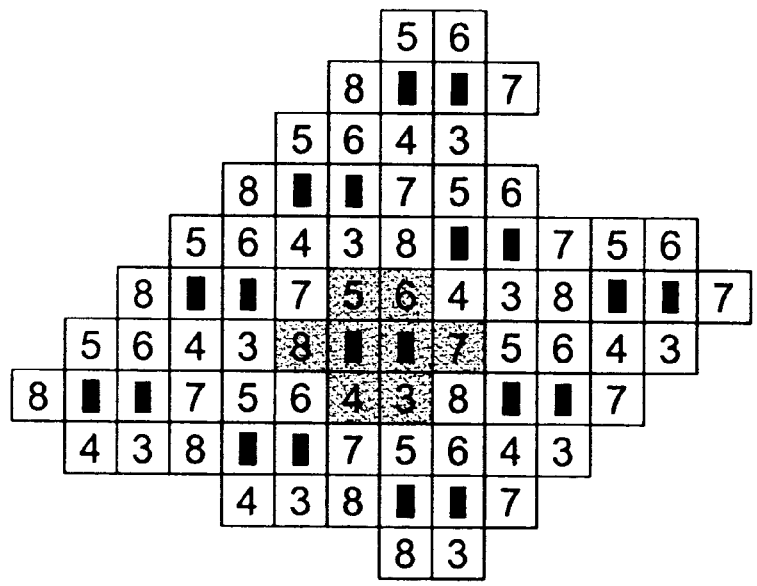
FIG. 8

APPARATUS AND METHOD FOR GRAY LEVEL PRINTING

CROSS-REFERENCE TO RELATED APPLICATIONS

This patent claims the benefit of the priority date and incorporates by reference the entire disclosure of U.S. Ser. No. 60/204,698 filed May 17, 2000.

FIELD

This invention relates to electrography, and in particular, to the generation of halftone images with reduced image artifacts and increased levels of gray by the use of a rotating magnetic brush with a hard magnetic carrier, in conjunction with a digital, multi-bit printhead and halftone rendering system capable of printing variable dot sizes.

BACKGROUND OF THE INVENTION

Electrographic print engines are used in printers and copiers to provide one or more copies of documents. Analog print engines rely upon a light lens to focus an image onto a charged image carrying member. Light strikes the charged image carrying member, discharges it and leaves a latent image on the member. Such print engines produce acceptable continuous tone images when the latent image on the image member is developed with developer comprised of a toner and a hard magnetic carrier. See for example U.S. Pat. Nos. 4,473,029; 4,531,832; 4,546,060; and 5,376,492, whose disclosures are incorporated by reference. Such copiers can reproduce images of photographs that are acceptable because they provide multiple levels of gray.

With the advent of digital technology, many images are captured with charge coupled arrays or other digital apparatus that converts the image into a set of pixels. In pure binary machines, the pixel is either on (black) or off (white). Such techniques are well suited to reproducing text because the sizes of the individual pixels that make up text symbols are much smaller than the symbols and the symbols are best seen with high contrast edges. Thus, the human eye sees the text as a continuous image even though it is a collection of closely spaced dots.

However, binary electrographic print engines do not provide acceptable levels of gray for other images, such as photographs. Those skilled in the art have used halftone dots to emulate gray scale for reproducing images with continuous tones. Newspapers and magazines are common examples of halftone printing. The reader does not see the halftone dots because they may be as small as $\frac{1}{2,500}^{th}$ to $\frac{1}{5,000}^{th}$ of an inch. Such small sizes are possible with ink and with newsprint and magazine media. However, such small sizes are virtually impossible with electrographic toner. Indeed, the toner particles themselves are larger than the size of halftone dots used by newspapers and magazines.

Conventional binary electrographic halftone print engines try to make the dots as small as possible. Conventional toner stations provide binary dots that are too large for acceptable halftone imaging. Hard dots, ideally having sharp edges, are also deficient when made with conventional binary arrays or rendering techniques using developer comprised of a toner and a hard magnetic carrier. The hard dots break up and do not provide the desired sharp edges. Accordingly, there is a need for a new electrographic print engine that provides better halftone imaging. Conventional binary electrographic print engines do not meet this need.

In the area of digital printing, all colors including black or gray are represented on paper as one or more gray levels where gray refers to a color density between no color and saturation. There are a number of algorithms for rendering halftone images. Digital printers commonly make a mark, usually in the form of a dot pixel, of a given, uniform size and at a specified resolution in marks per unit length, typically dots per inch (dpi), on paper. A digital printer emulates color intensity by placing marks, or dots, on the paper in a geometrical pattern. The effect is such that a group of dots and dot-less blank spots, when seen by the eye, gives a rendition of an intermediate color tone or density between the color of the initial paper stock, usually white, and total ink coverage, or a solid density halftone dot. It is conventional to arrange the dots in rows, where the distance between rows is known as line spacing, and determines the number of lines per inch (lpi). In the ensuing paragraphs, discussions will be made in terms of white paper stock; it is understood that white paper stock is used as an illustration and not as a limitation of any invention.

Continuous tone images contain an apparent continuum of gray levels. Some scenes, when viewed by humans, may require more than 256 discrete gray levels for each color to give the appearance of a continuum of gray levels from one shade to another.

As an approximation to continuous tone images, conventional digital print engines create pictorial or graphical images via halftone technology. Halftone pictorial or graphical images lower the high contrast between the paper stock and the toned electrographic image and thereby create a more visually pleasing image. Such halftone methods use a basic picture element (also known as a cell) on the recording or display surface. The cell consists of a j×k matrix of sub-elements (pixels or pels) where j and k are positive integers. A halftone image is reproduced by printing the respective sub-elements or leaving them blank. That is, by suitably distributing the printed marks in each cell. Such halftoning technology uses various rendering algorithms, such as those disclosed in U.S. Pat. Nos. 5,198,910, 5,258,849, and 5,260,807, the teachings of which are incorporated herein by reference in their entirety, to form, arrange and/or otherwise orient the marks so as to modulate the contrast between the dots and paper stock background to render the image more visually pleasing.

Halftone image processing algorithms are evaluated, in part, by their capability of delivering a complete gray scale at normal viewing distances. The capability of a particular process to reproduce high frequency renditions (fine detail) with high contrast modulation makes that procedure superior to one which reproduces the fine detail with lesser or no output contrast.

Another figure of merit of image processing algorithms is the ability to suppress visual details in the output image that are not part of the original image, but are the result of the image processing algorithm. Such details are called artifacts, and include false contours and false textures. False contours are the result of gray scale quantization steps which are sufficiently large to create a visible contour when the input image is truly a smooth, gradual variation from one gray level to another. False textures, and textures that are visual and change with rendered density, are artificial changes in the image texture which occur when input gray levels vary slowly and smoothly but the output generates an artificial boundary between the textural patterns for one gray level and the textural patterns for the next gray level. Commonly used processing algorithms include fixed level thresholding, adaptive thresholding, orthographic tone scale fonts, and electronic screening.

In creating halftone images, two factors are of prime consideration: the line screen frequency and the number of addressable picture elements, i.e., pixels. Once the line screen frequency is determined, the number of addressable pixels determines the number of definable, i.e., theoretical, gray levels. The definable gray levels for a binary system can be calculated by the following formula:

$$\text{Number of gray levels} = (dpi/lpi)^2 + 1$$

The screen frequency (lpi) tends to be set high so that the size of the dots are small and not visually detectable at normal viewing distances. An obvious problem arises when the resolution of the dot matrix on the paper is not very high, for example, 100 dpi or less. In such cases the geometrical patterns for the cell become visible to the eye. In that case the viewer is distracted from the image by artifacts of geometrical patterns themselves and perceives the impression of an image of poor quality. The obvious solution to this problem is to work at very high resolutions, for example, 300 dpi or greater, so that those artifacts are less perceived and their negative effects become less glaring. However, in view of the above formula, having a high screen frequency means there is a tradeoff with respect to the number of pixels available to create gray levels. Therefore, it would be desirable to maximize the number of defined gray levels while at the same time keeping the dots as small as possible.

Although a given number of gray levels can be theoretically set by selection of the dpi and lpi parameters, the number of gray levels attained in actual practice is limited by the shortcomings of known electrographic methods. For example, the number of gray levels discernable to the human eye are limited by a lack of sharpness surrounding the edges of the electrographic image, the presence of small "satellite" particles around the edges of the image or in the general background areas, and also by the inability to properly tone small, individual dots. The sharpness of continuous tone images such as those that are produced by flash or scanning light exposure systems are compromised by the optics through which they are produced. The above shortcomings can adversely impact the ability of such electrographic methods to create a smooth gray scale in pictorial or graphic images.

In recent years, digital printing technology has evolved to provide printheads with the ability to substantially increase the number of pixels per halftone cell. See, for example, the multi-bit printheads disclosed in U.S. Pat. Nos. 5,300,960, 5,604,527, and 5,739,841, the teachings of which are incorporated herein by reference in their entirety. The number of gray levels that those printheads can theoretically print can be determined using the following formula:

$$\text{Number of gray levels} = 1 + (\text{no. of pixels per cell}) \times (2^n - 1)$$

where n is equal to the number of bits associated with the image writing device and the number of pixels per cell is determined by $(dpi/lpi)^2$.

For example, where the image-writing device is a 4-bit digital printhead capable of 300 dpi, such as those illustrated in the foregoing patents, and n is equal to 4 in the above formula, the number of gray levels calculated for a 600 lpi screen frequency is equal to 121. The rendering programs previously mentioned herein employ mathematical algorithms which "build" the individual dots on the halftone image so as to create the gray levels, as is known in the art.

In electrography, an electrostatic charge image is formed on a dielectric surface, typically the surface of the photoconductive recording element. The image is developed by contacting it with a two-component developer comprising a mixture of pigmented resinous particles, known as toner, and magnetically attractable particles, known as carrier. The carrier particles serve as sites against which the non-magnetic toner particles can impinge and thereby acquire a triboelectric charge that will attract them to the electrostatic image. During contact between the electrostatic image and the developer mixture, the toner particles are stripped from the carrier particles to which they had formerly adhered (via triboelectric forces) by the relatively strong electrostatic forces associated with the latent image charge. In this manner, the toner particles are deposited on the electrostatic image to render it visible.

It is generally known to apply developer compositions of the above type to electrostatic images by means of a magnetic applicator that comprises a cylindrical sleeve of conductive, non-magnetic material having a magnetic core positioned within. The core usually comprises a plurality of parallel magnetic strips which are arranged around the core surface to present alternating north and south oriented magnetic fields. These fields project radially, through the sleeve, and serve to attract the developer composition to the sleeve outer surface to form what is commonly referred to in the art as a "brush" or "nap." Either or both the cylindrical sleeve and the magnetic core are rotated with respect to each other to cause the developer to advance from a supply sump to a position in which it contacts the electrostatic image to be developed. After development, the toner depleted carrier particles are returned to the sump for toner replenishment.

Conventional carrier particles for use with fixed magnetic cores are made of soft magnetic materials. However, soft magnetic carriers do not deliver toner to the electrostatic image in a manner such that the benefits of the foregoing multi-bit printheads and gray scale rendering of halftoned images can be fully realized. The conventional developer system has a rigid nap which essentially sweeps across the electrostatic image during development. As a result, images toned on such conventional development systems have a "brushed" like surface, and as a result provide images with more defects, i.e., satellite particles, oversized dots, and so on. The result is an image with far less actual gray levels than can be theoretically realized. The resulting images in many instances have a "grainy," relatively high contrast appearance and therefore are not as pleasing to look at relative to the image being reproduced by such system.

As can be seen, it would be desirable to develop methods and apparatus capable of providing halftoned images which provide an actual number of gray levels which approaches the theoretical number of gray levels that can be provided by a digital printhead and gray scale rendering system. Such methods and apparatus could provide higher quality reproduced images which are more visually pleasing to a viewer.

SUMMARY OF THE INVENTION

The foregoing objects and advantages are realized by the present invention, which provides an apparatus and a method for the generation of halftoned images with reduced image artifacts and increased number of gray levels. The apparatus is a copier or a printer with an electrographic print engine for printing variable density halftone images. The engine includes a controller with a rendering algorithm that groups sets of adjacent pixels into sets of adjacent cells where each cell corresponds to a halftone dot of an image. The algorithm operates in conjunction with a gray scale printhead as described below. In sending data to the printhead, the controller parses a scanned image and set the exposure for each pixel in accordance with a growth and density program. As part of the growth program, the algorithm selectively grows halftone dots from zero size to a desired size equal to or less than a maximum size. It grows the dots by increasing exposure of one pixel in the cell until the pixel reaches a first level of exposure. It repeats this step for the rest of the pixels until the cell is at its desired size and at an initial density. A fully grown cell has a certain density. If a higher density is desired, the algorithm changes to a second series of steps to increase the overall density of the cell. It selectively adjusts the fully grown cells by sequentially increasing the level of exposure of each pixel in the cell. The selective adjustment is made on one pixel and that pixel is raised one level. Density is further increased by repeating the last step with each pixel until all the pixels are adjusting upwards one level. If further adjustment is needed, another round of pixel-by-pixel increases are made until the cell is at the desired level or at its maximum cumulative density level.

The algorithm controls the pulse width of a timing circuit that turns on the light emitting diodes (LEDs) that generate the latent pixels on the image member. The timing circuit is part of a gray scale writer that has an array of LEDs for discharging areas of a charged image member. The latent image is carried past a developer station where the image is developed. The developer station includes a container which preferably holds a two-component developer including hard magnetic carrier particles and toner particles. A cylindrical magnetic roller is covered with a concentric sleeve. The roller and sleeve usually turn in opposite directions with the sleeve moving concurrently with the image. The sleeve picks up developer particles as it passes through a developer supply and gently applies the toner to the latent image on the image member. After development, the image is transferred to a copy sheet and fixed to the copy sheet at a fusing station.

The method of the invention includes a number of steps. The image is captured in a raster format that includes a plurality of pixels. The pixels are grouped into sets that form cells where each cell includes multiple pixels. The rendering algorithm manipulates the digital data to generate halftone dots of variable sizes and variable densities. The rendered dots are used to expose a photoconductive surface of an image member and create a halftone electrostatic latent image of the original image. That latent image contacts a rotating magnetic brush at a development station where the developer includes a hard magnetic carrier and a toner.

In another aspect, the invention concerns an apparatus for the electrographic generation of halftoned images. The apparatus comprises a multi-bit printhead, means for generating a halftone image of varying dot sizes and densities, and a rotating magnetic brush development system comprising a developer composition comprised of a hard magnetic carrier and a toner.

DRAWINGS

FIGS. 3(a)–3(j) show successive growth of a variable size cell and selectivity increased density of the cell.

FIG. 4 compares a binary print of one gray level made with hard carrier particles and a binary print of the same gray level made with soft carrier particles.

Figure 5:
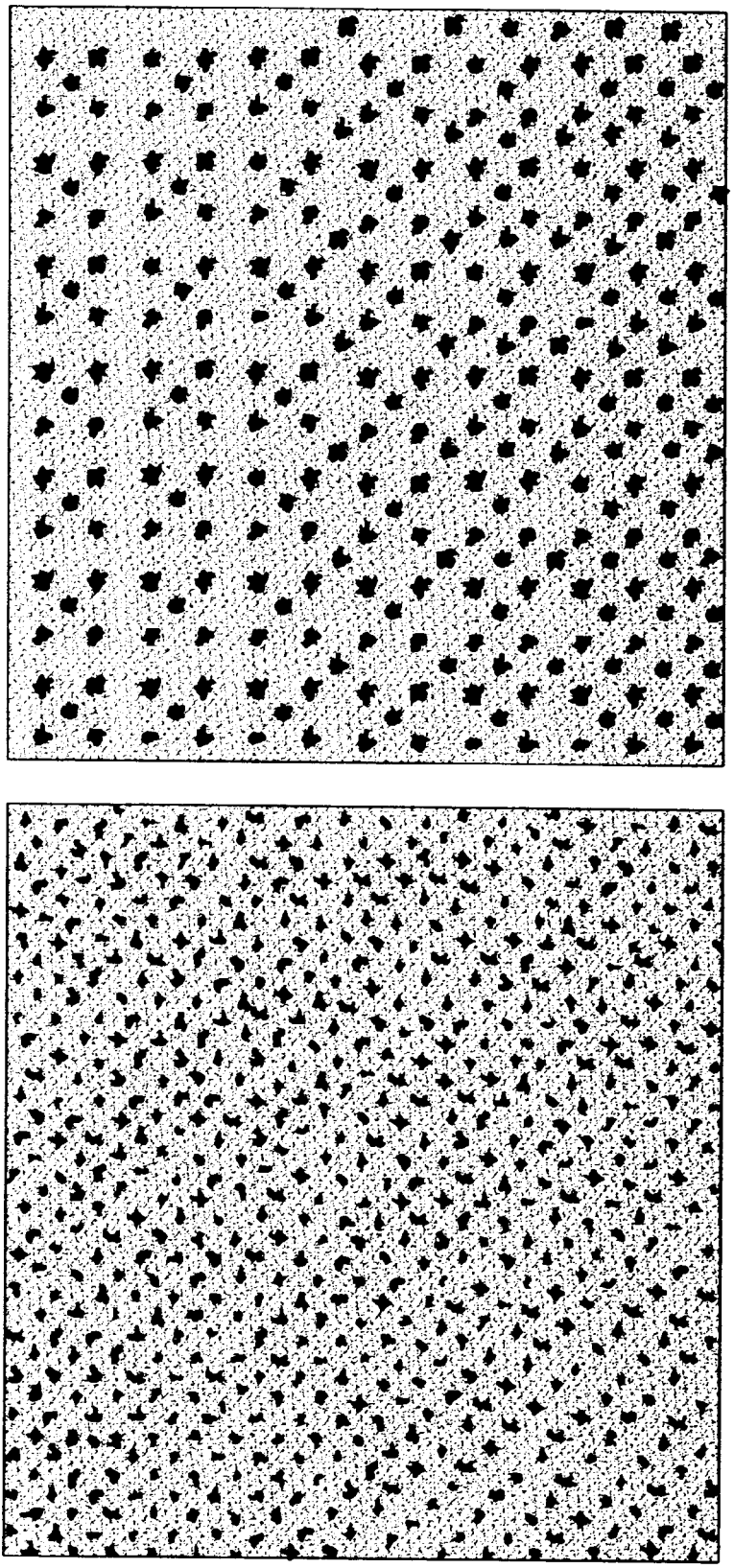

FIG. 5 compares a gray level printed with a multi-bit algorithm and a single bit (binary) algorithm. Both used hard magnetic carrier.

Figure 6:
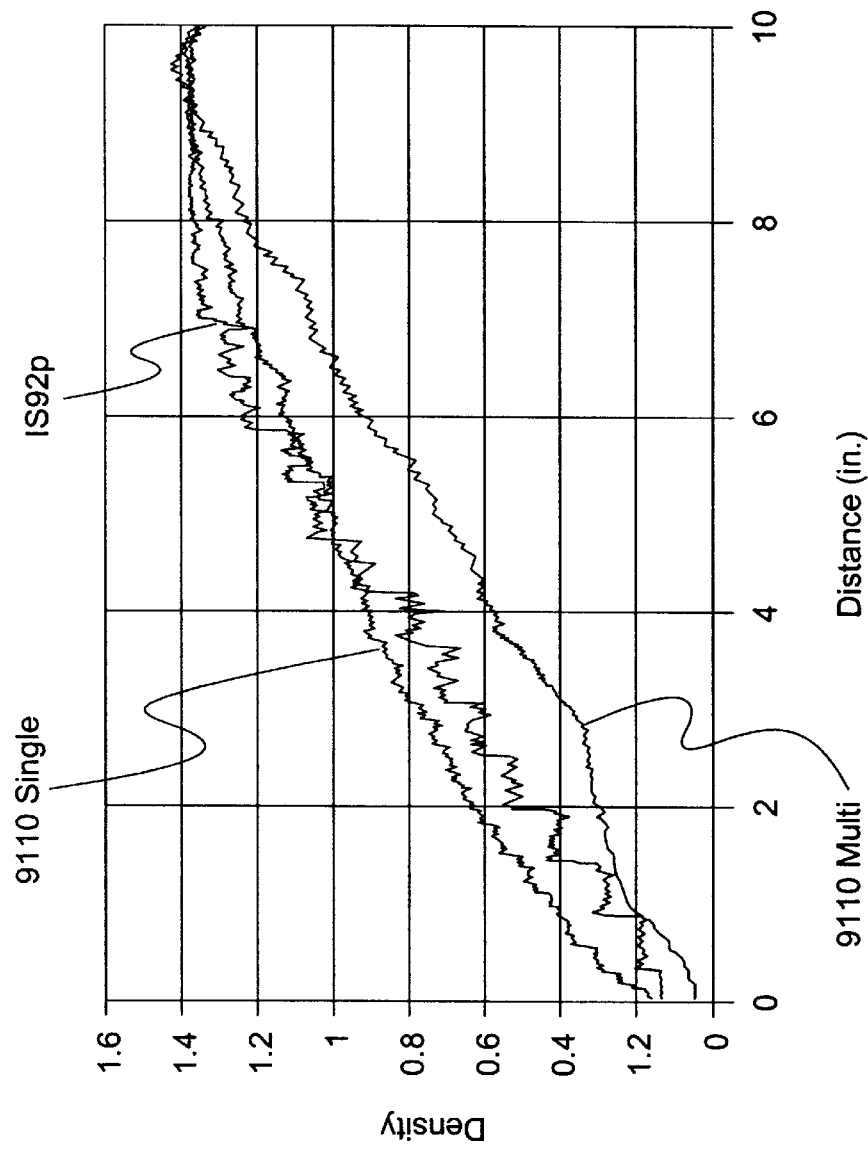

FIG. 6 is a graphic comparing gray levels produced under different conditions.

Figure 7:
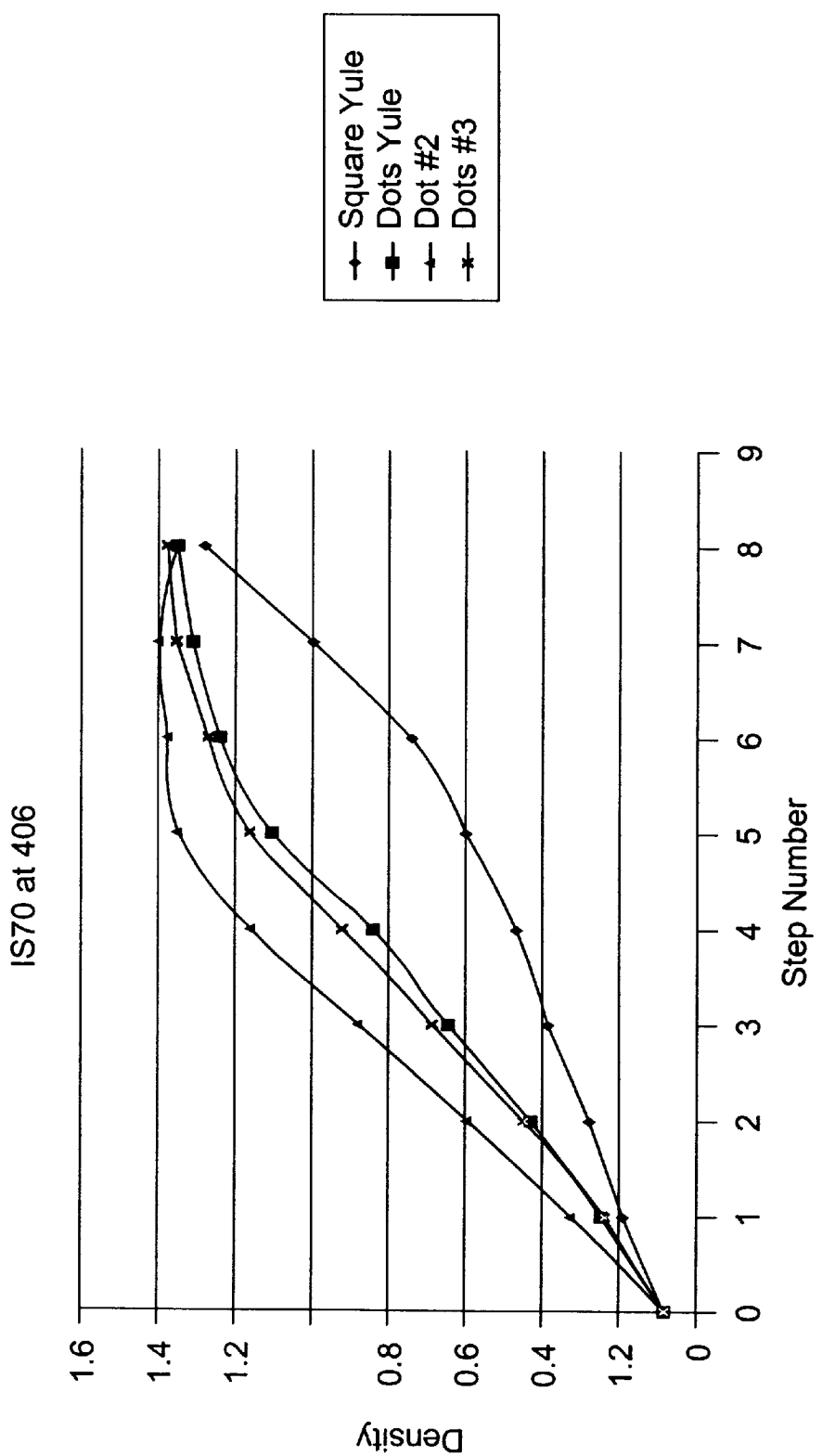

FIG. 7 is a reference graph.

FIG. 8 shows the cell used to produce the graphs in FIG. 7.

Figure 9:
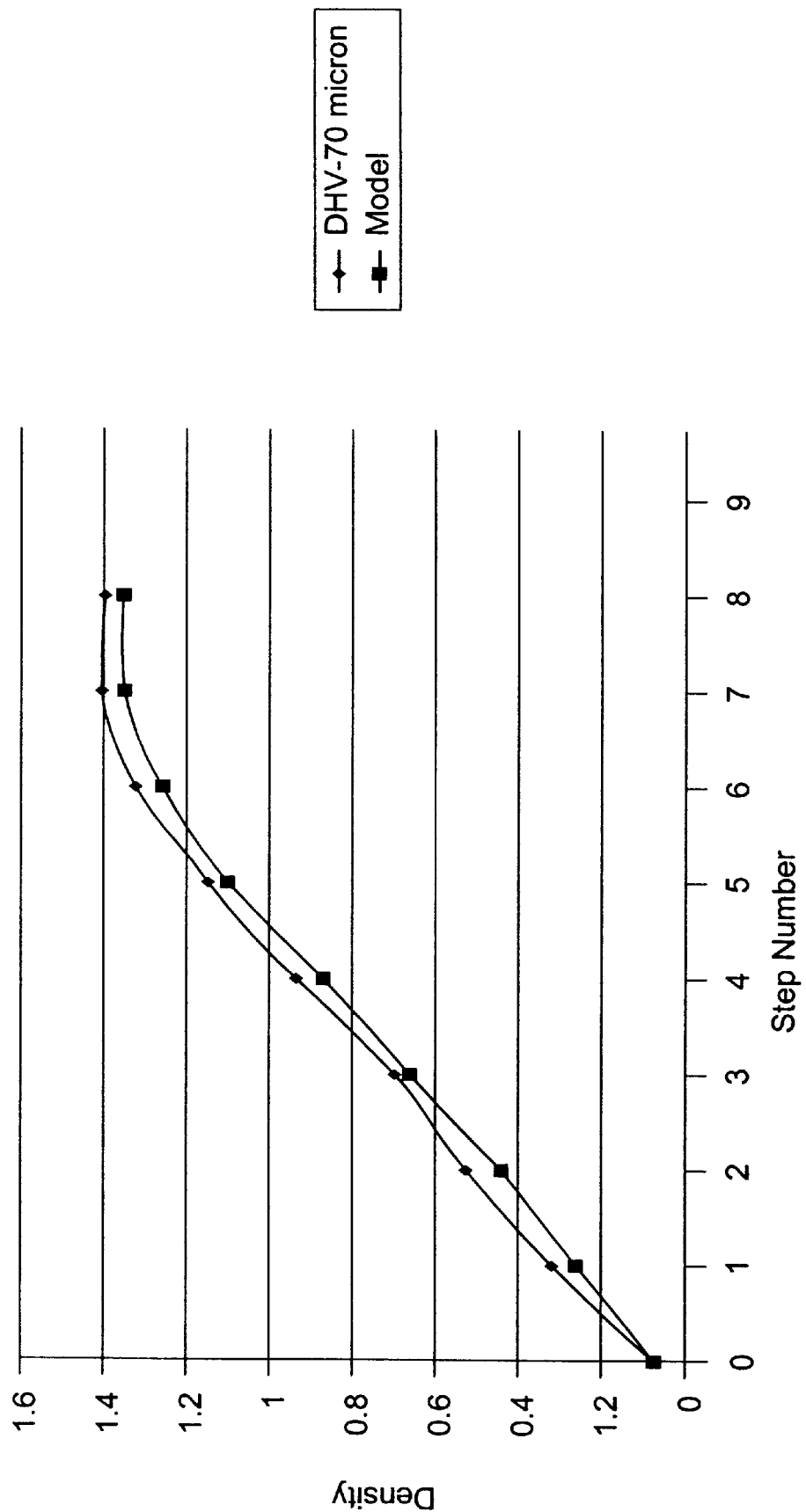

FIG. 9 is a graph comparing actual performance of a printing apparatus of the invention with its predicted model performance.

Figure 10:
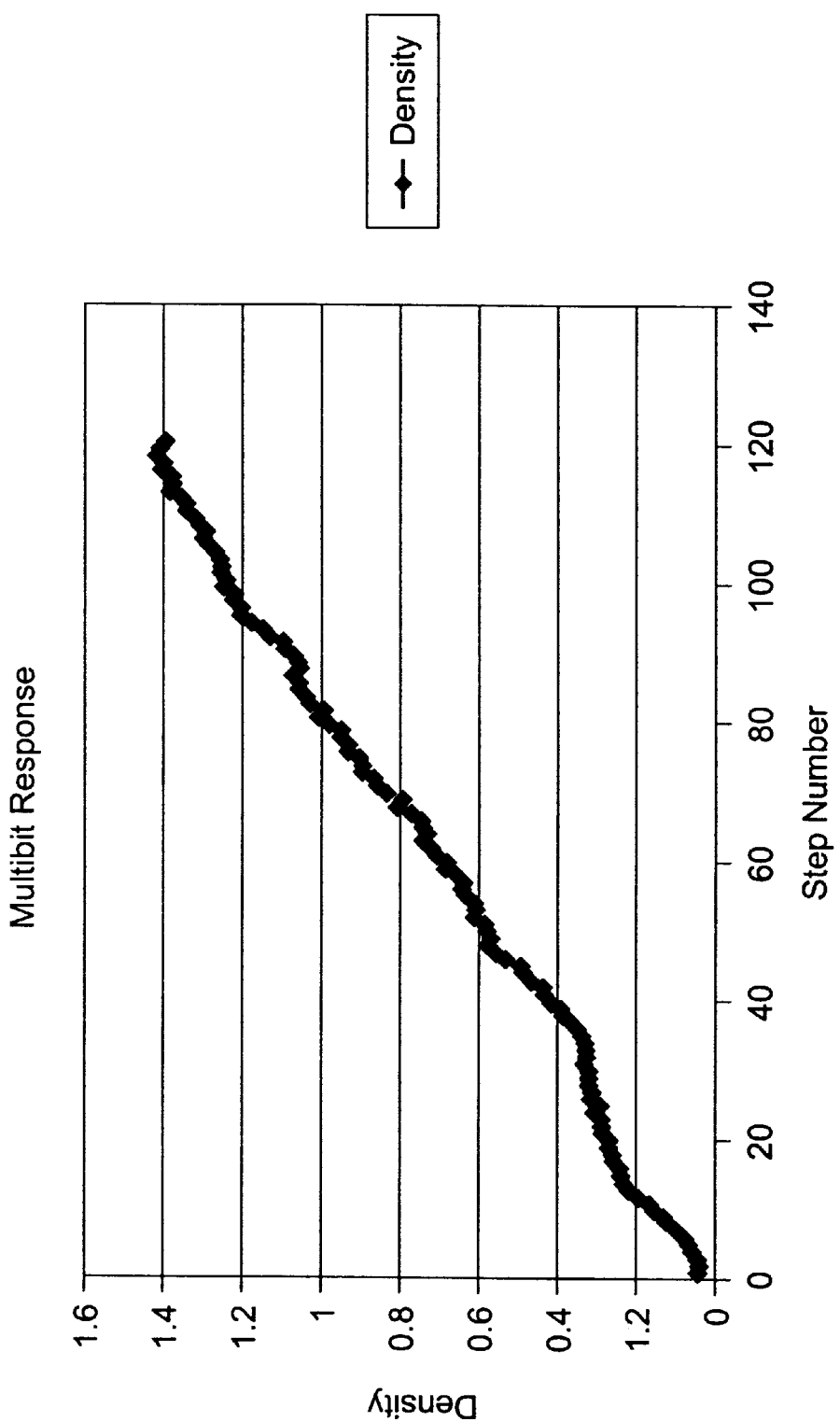

FIG. 10 is a graph showing performance of the invention in a 4-bit multi-bit printhead.

DETAILED DESCRIPTION OF THE INVENTION

A description of printhead hardware and gray scale rendering methods is provided above and in the patents previously incorporated by reference.

Figure 1:
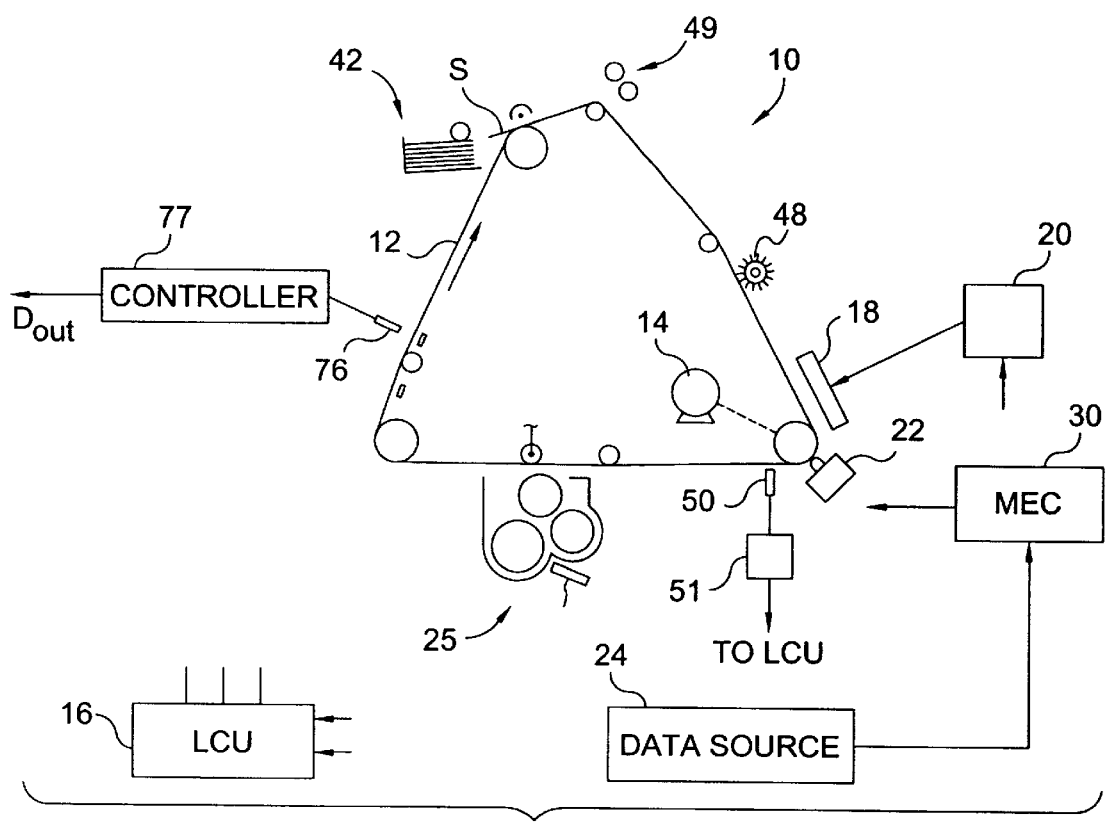
FIG. 1 is a diagram of an electrographic recording apparatus of the invention.

Because apparatus of the general type described herein are well known, the present description will be directed in particular to elements forming part of, or cooperating more directly with, the present invention. With reference to the copier/printer apparatus 10 as shown in FIG. 1, a moving recording member such as photoconductive belt 12 is driven by a motor 14 past a series of work stations of the printer. A logic and control unit (LCU) 16, which has a digital computer, has a stored program for sequentially actuating the work stations.

A charging station 18 sensitizes belt 12 by applying a uniform electrostatic charge of predetermined primary voltage $V_0$ to the surface of the belt. The output of the charger is regulated by a programmable controller 20, which is in turn controlled by LCU 16 to adjust primary voltage $V_0$ for example through control of electrical potential ($V_{GRID}$) to a grid that controls movement of charges from charging wires to the surface of the recording member as is well known.

At an exposure station, projected light from a non-impact write head 22 dissipates the electrostatic charge on the photoconductive belt to form a latent image of a document to be copied or printed. The write head or printhead has an array of recording elements preferably light-emitting diodes (LEDs) or other light or radiation-emitting sources for exposing the photoconductive belt picture element (pixel) by picture element with an intensity regulated by current drivers on the printhead and as will be described in more detail below. A scanning laser or other means may be substituted for the LEDs.

Image data for recording is provided by a data source 24 for generating electrical image data signals. The source may be one or more apparatus of the group including a computer, a document scanner, a memory, a data network facsimile, word processor, data reader, etc. Signals from the data source and control signals from the LCU 16 are provided to a marking engine controller (MEC) 30. The marking engine controller responds to these signals to generate signals for output to the printhead for controlling selective enablement of the LEDs. Light from the LEDs may be focused by a suitable lens for imaging upon the electrostatically charged belt 12. The printhead, in addition to recording image information, is also adapted to record process control patches that are usually located in an interframe between recorded images. The test patches determine a need to adjust process control parameters. In order to form patches with density, the LCU 16 or MEC 30 may be provided with ROM or other memory representing data for creation of a patch. Travel of belt 12 brings the areas bearing the electrostatic latent images into a developer station 25. The developer station has a magnetic brush in juxtaposition to, but spaced from, the travel path of the belt. Magnetic brush development stations are well known. For example, see U.S. Pat. No. 4,473,029 to Fritz et al and U.S. Pat. No. 4,546,060 to Miskinis et al.

LCU 16 selectively activates the developer station 25 in relation to the passage of the image areas containing latent images to selectively bring the magnetic brush into engagement with or to within a small spacing from the belt. The charged toner particles of the engaged magnetic brush are attracted imagewise to the latent image pattern to develop the pattern.

As is well understood in the art, conductive portions of the development station, such as conductive applicator cylinders, act as electrodes. The electrodes are connected to a variable supply of electrical potential $V_B$ regulated by a programmable controller (not shown). Details regarding the development station are provided as an example, but are not essential to the invention.

A transfer station 42 as is also well known is provided for moving a copy sheet S into engagement with the photoconductor in register with the image for transferring the image to the copy sheet. Alternatively, an intermediate member may have the image transferred to it and the image may then be transferred to the copy sheet. A cleaning station 48 is also provided subsequent to the transfer station for removing toner from the belt 12 to allow reuse of the surface for forming additional images. In lieu of a belt, a drum photoconductor or other structure for supporting an image may be used. After transfer of the unfixed toner images to a copy sheet, such sheet is transported to a fuser station 49 where the image is fixed.

The LCU provides overall control of the apparatus and its various subsystems as is well known. Programming commercially available microprocessors is a conventional skill well understood in the art. The following disclosure is written to enable a programmer having ordinary skill in the art to produce an appropriate control program for such a microprocessor. In lieu of only microprocessors the logic operations described herein may be provided by or in combination with dedicated or programmable logic devices.

Process control strategies generally utilize various sensors to provide real-time control of the electrostatographic process and to provide continuous image quality output from the user's perspective.

One such sensor may be a densitometer 76 to monitor development of test patches in non-image areas of photoconductive belt 12, as is well known in the art. The densitometer is intended to insure that the transmittance or reflectance of a toned patch on the belt is maintained. The densitometer may consist of an infrared LED which shines through the belt or is reflected by the belt onto a photodiode. The photodiode generates a voltage proportional to the amount of light received. This voltage is compared by controller 77 to the voltage generated due to transmittance or reflectance of a bare patch, to give a signal representative of an estimate of toned density. This signal $D_{OUT}$ furnished to the LCU is transmitted to the LCU and may be used by the LCU in accordance with a program stored therein to adjust $V_0$ exposure, $E_0$, or $V_B$. In addition to measuring density an electrometer 50 may be provided to measure the charge remaining after exposure but prior to development of the patch. The measured charge signal is also provided to the LCU for use in adjustment of the various process control parameters.

The density signal $D_{OUT}$ may be used to detect short term changes in density of a measured patch to control primary voltage $V_0$, $E_0$ and/or $V_B$. To do this, $D_{OUT}$ is compared with a set point density value or signal D(SP) and differences between DOUT and D(SP) cause the LCU to change settings of $V_{GRID}$ on charging station 18 or adjust exposure through modifying exposure duration or light intensity for recording a pixel and/or adjustment to the potentials $V_B$ at the two development stations. These changes are in accordance with values stored in the LCU memory, for example, as a look-up table. In accordance with the invention, changes required for operation of the printhead exposure parameters are provided in an efficient way to minimize delays in printing.

Figure 2A:
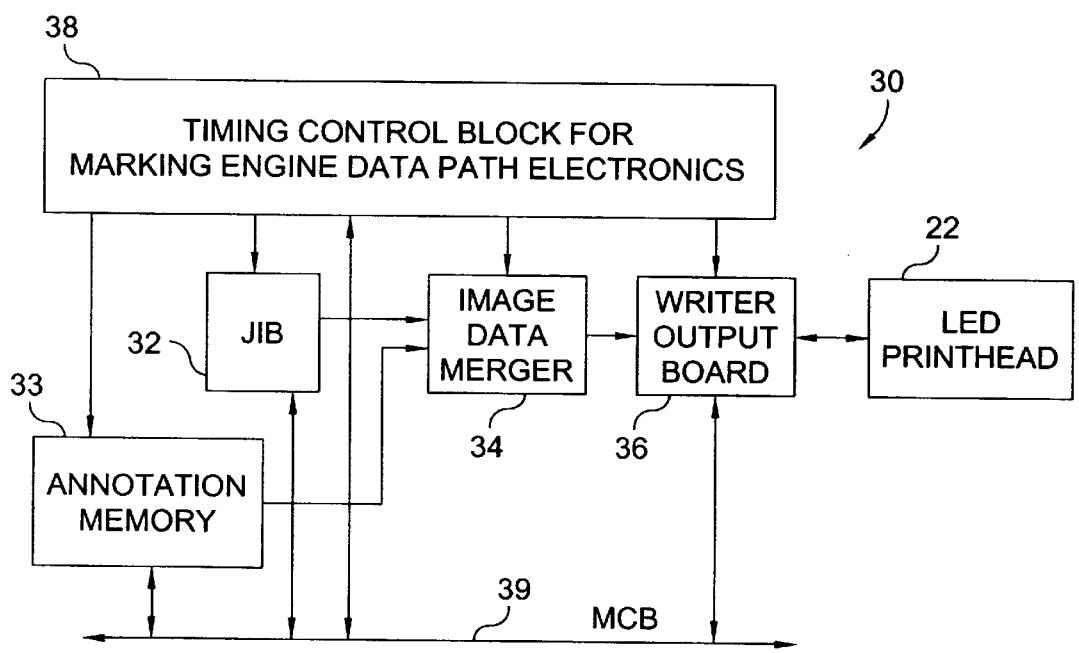
FIG. 2(a) is a block diagram of an image data path in a portion of the apparatus of FIG. 1.
Figure 2B:
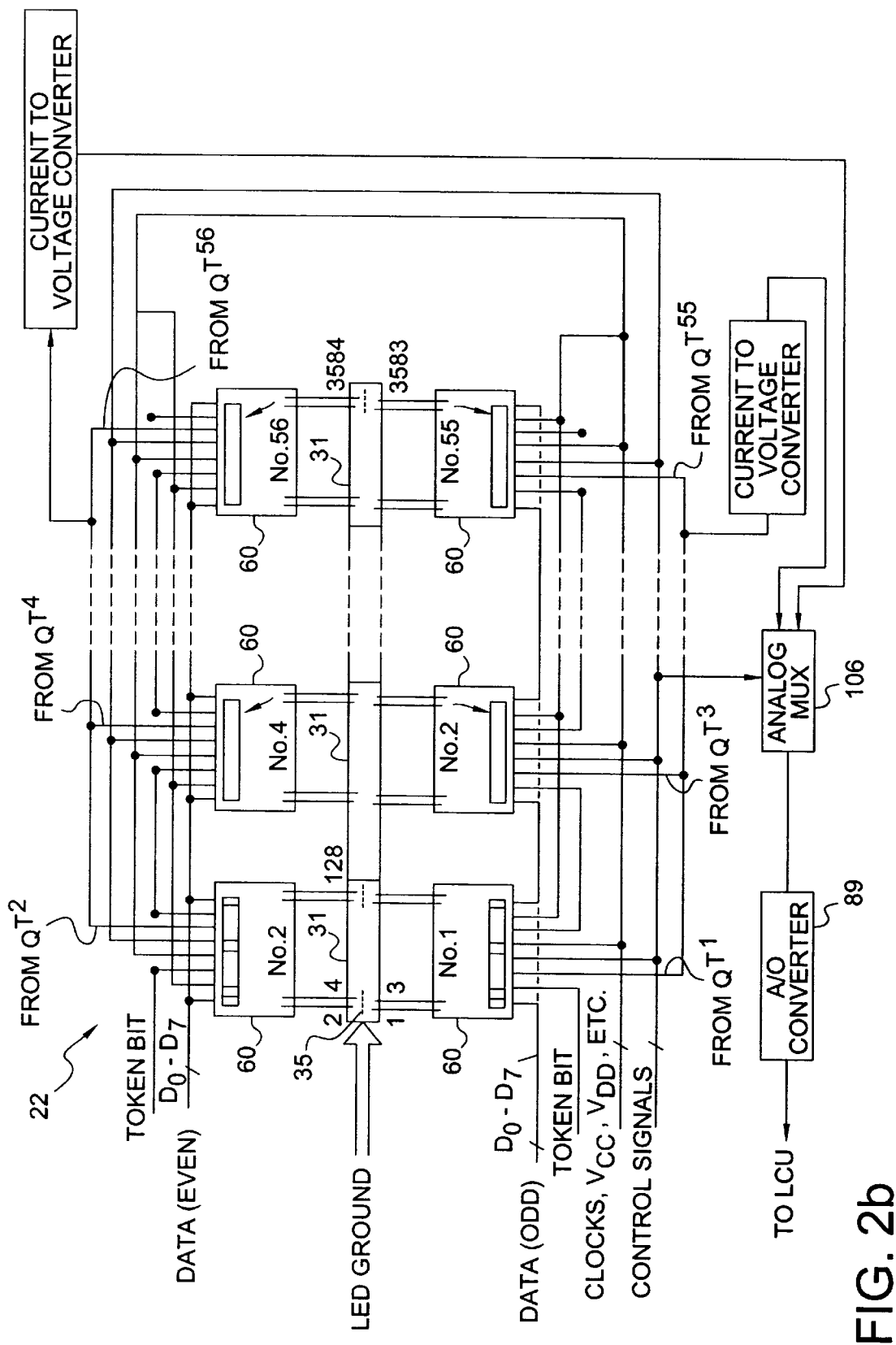
FIG. 2(b) is a block diagram of a printhead 22.
Figure 2C:
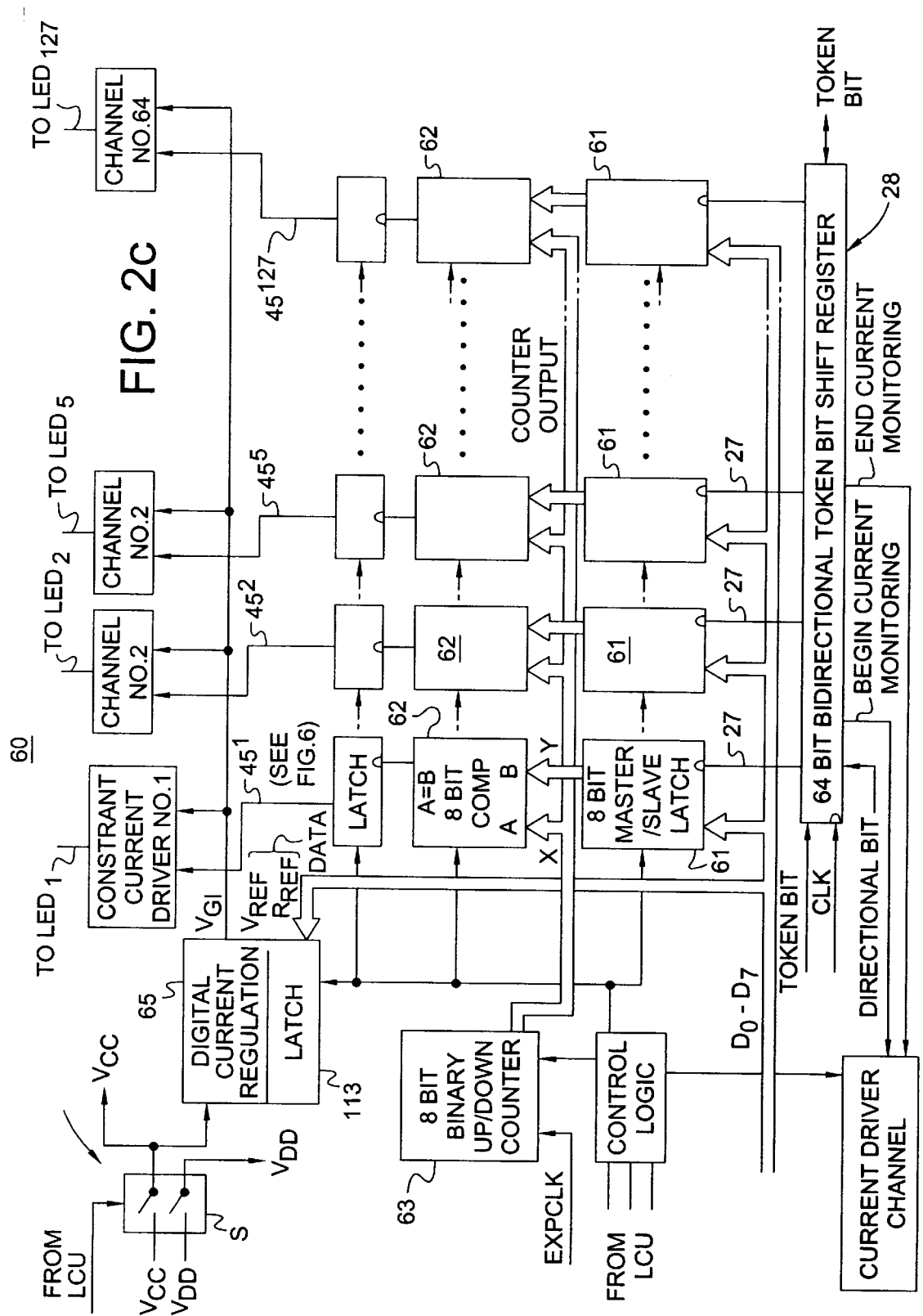
FIG. 2(c) is a block diagram of a driver chip 60.

With reference now to FIG. 2(a), a block diagram schematic of a marking engine controller's data path in accordance with the invention is provided. The marking engine controller 30 includes a job image buffer (JIB) 32 into which rasterized data received from data source 24 is stored for example in compressed form. Data from data source 24 is compressed, stored in a multipage image buffer and expanded for output from the JIB. Several pages of data for each job can be stored to allow for reproducing multiple copy sets. An example of a job image buffer is described in U.S. Pat. No. 5,384,646. When a production job stored in the JIB is to be printed, the image data is output to an image data merger device 34 wherein the data in the JIB can be merged with annotation data such as logos, time and date stamps, addresses, etc., stored in a nonvolatile annotation data memory 33. The merger may be logic devices and buffers or other known devices for performing this function or the merger device may be deleted. The image data whether merged with additional data to be printed or not merged is then output to a writerinterface (WIF) output board 36. The WIF 36 modifies the image data before sending to the printhead 22 so that the data, for each pixel to be recorded by an LED on the printhead is adjusted to also control uniformity of that LED. An example of a gray level LED printhead that may be provided with corrected image data signals is disclosed in U.S. Pat. No. 5,253,934, the contents of which are incorporated herein by reference. As noted in this patent and with reference to FIGS. 2(b) and 2(c), corrected image data and control signals, such as clock signals, token signals, latch signals, power, etc. are sent to the printhead from the writer-interface 36 over a data bus and control bus. The data and control signals are input into driver chips 60 which are located on each side of a line of LED chip arrays 31. Each LED chip array includes for example 128 LEDs 35 arranged in a line. The chip arrays are butted together to provide a single row of several thousand LEDs. The driver chips 60 receive the data and control signals and are used to generate current for driving the LEDs to which the driver chips are electrically connected. Within each driver chip, the corrected image data is latched in respective image data latch or storage registers 61 and an exposure period for recording a pixel is commenced and the duration of currents to respective LEDs determined by comparison by a comparator 62 of corrected image data signals with an output of a counter 63 that is counting exposure clock pulses. Control of current in each of plural driver channels is provided to respective LEDs on the printhead by a constant current driver that forms a part of a current mirror having a master circuit 65 that generates a controlled amount of current in response to digital current control data that is also sent to the printhead. In response to this current control data certain current-conducting transistors are enabled in the master circuit to cause a net current to flow in the master circuit and this net current is related to the current control data denoted in U.S. Pat. No. 5,253,934 as VREF and RREF. In the aforementioned patent, the term "VREF" refers to a current control data of 8-bits size that is provided identically to all the driver chips that are on the printhead while the term "RREF" refers to current control data of 8-bits size that may differ from driver chip to driver chip on the same printhead. As noted in the aforementioned patents, a row of say 128 LEDs maybe formed on each chip array and a series of these arrays are assembled on a suitable support to provide a printhead with a single row of LEDs that are of several thousand LEDs. Each LED chip array may have one or preferably two driver chips associated therewith and mounted adjacent thereto for providing current to LEDs selected to record a pixel. In response to selection or enablement of an LED a current is generated in a current-generating channel of the driver chip and this current energizes the respective LED to emit light for a period of time related to the corrected image data signal. The current to the LED mirrors, i.e., is proportional to or related to that in the driver chip master circuit. Thus, effective control of the LED is provided with say 6-bits per pixel of image data to define a recording duration and 16-bits of current control data used to control current thereto. As the term VREF describes current control data that is applied to all the driver chips, it will hereinafter be referred to as GREF current control data to more precisely describe its characteristic as a "global reference" voltage generating data, whereas RREF will be referred to as LREF in view of its being "local reference" voltage generating data; i.e. it may vary from driver chip to driver chip on the printhead.

The WIF board 36 thus provides to the printhead 22 in addition to corrected image data signals, control and timing signals such as current control data GREF and LREF, signals for latching data in respective image data storage registers 61, clock signals including that for timing exposure (EXPCLK). In addition, there are provided power and ground signals. The various control timing signals are provided by timing control board 38 that forms part of the control system for controlling the marking engine.

The MEC 30 includes a computer program for a rendering algorithm. The rendering algorithm groups the pixels of the image into cells of 16 pixels, for example, and controls the density of the exposure of each pixel in the cell. There are a number of conventional algorithms that group pixels into larger cells and control the pixels. We have found that results are surprisingly best when the algorithm first sets the size of the cell and then adjusts its density. It sets the size of the cell by increasing the exposure on-time of one pixel at a time until all the pixels in a cell are taken to a first level of exposure. The size of the cell is thus established by an iterative process that grows the cell one pixel at a time until all 16 pixels are at the same maximum level. The process stops when the cell as a whole reaches the desired cumulative level of density. The density of any fully grown cell is selectively adjusted by sequentially raising one pixel at a time one level at a time.

For example, turn to FIGS. 3(a)–3(j). There is shown a cell 200 that is a 4×4 array of 16 pixels. Pixel 210 is initially exposed to a first level in FIG. 3(a) and is stepwise increased in FIGS. 3(b)–3(d) until it reaches its first maximum value. Notice how the level of gray of pixel 210 gradually increases from FIG. 3(a) to FIG. 3(d). The cell 200 may be grown to its full 16 pixel size by stepwise raising one pixel at a time to the first maximum level as shown in FIGS. 3(e)–3(g). As shown in FIG. 3(g), the cell 200 is at its maximum size and is at a cumulative first level of density. If the cell is selected to be denser (i.e., a blacker dot) then the first pixel 210 is again selectively increased in its level of exposure. However, after its first stepwise increase, each of the other pixels is stepwise increased until all of the pixels are cumulatively increased at least one step. If more density is desired, then the pixels are again stepwise increased one pixel at a time. The final step brings all the pixels to a second cumulative maximum level. That level corresponds to the largest, darkest dot made by the system. In the illustrations, only several shades of gray are shown. In practice, there are about 12 levels of gray for the initial step of growing the cell and another 12 levels of gray to increase the density of a fully grown cell.

The individual level of each pixel is calculated by the rendering algorithm. The results of the rendering algorithm are used to drive the light emitting diodes. The higher the level of exposure, the longer the corresponding diode is kept on. All diodes are turned and rise to the same maximum intensity. Variations in the density of each pixel are determined by the on time of each diode. That time is set by a pulse width modulating circuit in a manner well known in the art.

In operation, the data source 24 scans the image that is to be reproduced. The image is pixelated in accordance with the above described algorithm. Then the individual exposure values for each pixel are transmitted to the MEC 30 in order to provide halftone exposure of the image member by creating halftone dots of various sizes and various densities. After the image member is exposed to the LED array, a latent image is formed. That image passes to a developer station using a two-component developer comprised of a hard magnetic carrier and a toner for developing latent images.

U.S. Pat. Nos. 4,546,060, 4,473,029 and 5,376,492, the teachings of which are incorporated herein by reference in their entirety, teach the use of hard magnetic materials as carrier particles and also apparatus for the development of electrostatic images utilizing such hard magnetic carrier particles. These patents require that the carrier particles comprise a hard magnetic material exhibiting a coercivity of at least 300 Oersteds when magnetically saturated and an induced magnetic moment of at least 20 EMU/gm when in an applied magnetic field of 1000 Oersteds. The terms "hard" and "soft" when referring to magnetic materials have the generally accepted meaning as indicated on page 18 of Introduction To Magnetic Materials by B. D. Cullity published by Addison-Wesley Publishing Company, 1972. These hard magnetic carrier materials represent a great advance over the use of soft magnetic carrier materials in that the speed of development is remarkably increased. Speeds as high as four times the maximum speed utilized in the use of soft magnetic carrier particles have been demonstrated.

In the methods taught by the patents referenced in the preceding paragraph, the developer is moved in the same direction as the electrostatic image to be developed by high speed rotation of the multi-pole magnetic core within the sleeve, with the developer being disposed on the outer surface of the sleeve. Rapid pole transitions on the sleeve are mechanically resisted by the carrier because of its high coercivity. The brushed nap of the carrier (with toner particles disposed on the surface of the carrier particles), rapidly "flip" on the sleeve in order to align themselves with the magnetic field reversals imposed by the rotating magnetic core, and as a result, move with the toner on the sleeve through the development zone in contact with or close relation to the electrostatic image on a photoconductor. See also, U.S. Pat. No. 4,531,832, the teachings of which are also incorporated herein in their entirety, for further discussion concerning such a process.

The rapid pole transitions, for example as many as 467 per second at the sleeve surface when a 14 pole magnetic core is rotated at a speed of 2000 revolutions per minute (rpm), create a highly energetic and vigorous movement of developer as it moves through the development zone. This vigorous action constantly recirculates the toner to the sleeve surface and then back to the outside of the nap to provide toner for development. This flipping action thereby results in a continuous feed of fresh toner particles to the image. As described in the above-described patents, this method provides high density, high quality images at relatively high development speeds.

In particular, it is preferred to operate the foregoing hard magnetic carrier development system using the various set points and other operating parameters as described in copending U.S. Provisional Patent Application Serial No. 60/204,882 filed May 17, 2000, "ELECTROSTATIC IMAGE DEVELOPING PROCESS WITH OPTIMIZED SETPOINTS" and listing Eric C. Stelter as an inventor. The teachings of this provisional patent application are hereby incorporated by reference in their entirety.

Without being bound by theory, it is believed that development of images with a hard magnetic carrier as previously described results in application of toner without a severe side-sweeping motion of the nap; in other words, the "flipping" action mentioned above results in more of the toner being applied in a vertical fashion relative to the electrostatic image, i.e., perpendicular to the plane in which the electrostatic image resides. This effect, in combination with the ability of the hard magnetic carrier to carry a relatively greater amount of toner, results in what can be described as a "fluffing" of toner onto the electrostatic image, which is believed to allow for better toning of electrostatic images produced by electrographic equipment using the multi-bit printheads and gray scale rendering methods previously described.

The invention is illustrated by the following examples:

Comparative Examples A–B

FIG. 4 shows a magnified comparison of print densities obtained from use of a hard magnetic carrier toning station in a DigiSource™ 9110 or a DigiMaster™ 9110 machine (available from NexPress Solutions, L.L.C. of Rochester, N.Y.) and an older InfoSource™ 92p printer. The Digisource™ 9110 machine is equipped with a binary, single-bit, 600 dpi LED writer. The IS92p printer is representative of a line of electrographic printers binary single-bit with 600 dpi LED writers and conventional toning stations. Conventional toning stations are those which have fixed core magnets with rotating shells providing transport for a developer made up of soft magnetic carrier particles and toner. The image analyzer graphics of FIG. 4 show that the IS92p development station will tone a single pixel spot if it is a hard, heavily exposed location. However, lower exposure levels would clearly not allow for uniform capture of enough toner particles to create a consistent image, i.e. toner particles may not be captured by the weaker electrical latent image of the exposure on the photoconductor surface. The general result is that the dots do not fill in completely enough to give the subtle differences between individual gray levels. Satellite particles or print background also limit the ability of the conventional toning station to create multiple steps in the higher density areas, tending to block or fill in the shrinking white areas which are necessary for gray level gradation in the higher density areas.

EXAMPLE 1 and Comparative Example C

FIG. 5 shows a magnified comparison of the print densities obtained from use of a hard magnetic carrier toning station in a DigiSource™ 9110 or a DigiMaster™ 9110 machine equipped with a binary, single-bit, 600 dpi LED writer and a substantially similar machine, except that it has been modified with a multi-bit (4-bit) 600 dpi LED writer. FIG. 5 shows a comparison of the rendering of a specific gray level in the lighter end of the density scale showing the more subtle gray level rendering available to the multi-bit printhead as opposed to that same gray level rendered in single bit. It is this patterning of the single bit super-pixel growth that leads to contouring or visible patterns in what should be a smooth gray area. Because of the limited number of pixels available in a small super pixel, some gray levels will show a visible dot pattern, regardless of the rendering algorithm used to grow them. With multi-bit rendering, the number of choices of either fully exposed pixels or partially exposed pixels allows super-pixel growth algorithms which are essentially smooth to the unaided eye, resulting in the smooth flow through the gray scale with no apparent steps.

EXAMPLE 2 and Comparative Examples D–E

Density Scans of Continuous Gray Scales

FIG. 6 is a set of density scans (density vs. position) along a continuous gray scale produced under several conditions. The same file was printed three times. The first scan is from the IS92p printer which uses a conventional toning station and a 600 dpi LED writer as described in Comparative Examples A–B. It uses a single bit rendering scheme, depending on solid pixels to build up the gray levels. The 17 levels of gray permitted by the resident PostScript level 2 rendering software thereon are about the limit to the achievable gray levels, primarily due to the conventional toning system employed. The second scan is of a print from a DigiMaster™ 9110 printer equipped with a single-bit rendering scheme as in Comparative Examples A–B, and shows the improvement due to both the PostScript level 3 rendering and the improved toning system, i.e. hard magnetic carrier development technology. The trace still shows signs of the steps, but with lower density differences between steps. The third scan is that of a machine which is substantially similar to the DigiMaster™ 9110 machine previously described, except that it has been modified with a multi-bit, 600 dpi printhead and multi-bit rendering as described in Example 1. The trace is smooth, without steps, and without the characteristic high contrast of a normal electrographic process.

In the following examples and comparative examples, all figures referenced are plots of reflection density vs. step number.

Comparative Example F

FIG. 7 is included for reference. All prints are made on an InfoSource™ 70 machine, equipped with a developing station utilizing hard magnetic carrier and a binary, single-bit 406 dpi printhead. The rendering software utilized is shown in the series of halftone cell layouts generally labeled as FIG. 8. FIG. 8 illustrates which pixel is turned on during each of the 9 steps, i.e., the 9 gray levels available with the binary printhead, with no pixels turned on being understood as pure white. The "Square No Yule" on FIG. 7 is a plot of a very low frequency (about 40 lpi) version of the screen, and it is very distracting, in that the pattern of pixels is readily apparent to a human eye at normal viewing distances. Due to the low frequency, the "pixels" are simulated by actually printing little squares of real pixels. Also because of the low frequency, the Yule-Nielson effect as known to those skilled in the art is insignificant. The screen frequency for the other curves is approximately 143 lines per inch at 45 degrees.

In FIG. 7, the plots labeled "Dots Yule" and "Dots #3" are repeats from the same machine. True single pixels were used for the lowest step. The approximate single pixel size is 55 microns, which is less than the target of 88 microns for the diameter of an individual dot being equal to the diagonal of the pixel grid. This is controlled by the setup of the machine. Blocking or saturation is not occurring at steps 6–8, and the delta between steps is great, thereby yielding an image which shows significant contrast between individual gray levels, and therefore, is not as visually pleasing.

In FIG. 7, the plot labeled "Dots #2" is for a substantially similar InfoSource™ 70 machine, except it is set at different operating conditions as described hereinafter. The single pixel size here is set to be about 79 microns, or closer to the 88 micron target size for a dot. Note that the delta between step one (paper base) and step 2, all single pixel dots, is much larger than the delta in the same location for the plots labeled "Dots Yule" and "Dots#3" discussed above, and that the shoulder on the curve, i.e., the curve at about steps 6–8, clearly shows that blocking or saturation is occurring, i.e., the dots have overlapped and here is no white space left, thus, there is no visual differentiation between the dots (and gray levels) at such steps.

Example G

FIG. 9 shows plots from a standard DigiMaster™ 9110 with hard magnetic carrier development and a single-bit, 600 dpi printhead. The screen is set at 212 lines per inch. The Model curve illustrating theoretical performance of the system is shown for reference, and is calculated by assuming perfectly round pixel dots, a surface reflection of 4.5%, a halftone dot diameter equal to the length of the diagonal for the pixel grid, and that the Yule-Nielsen effect is reflecting light at the surface of the paper. Basically, the DigiMaster™ 9110 is performing almost exactly as the model predicts. This model includes the effects of the paper reflectance being less than one, there being first surface reflections from the toner surface, and the Yule-Neilson effect of light scattering in the paper. The single pixel size is approximately 70 microns, which is slightly larger than the ideal of 60 microns as used in the model calculation.

EXAMPLE 3

FIG. 10 shows plots from a machine substantially similar to the DigiMaster 9110, except that it has been modified with a multi-bit (4 bits), 600 dpi printhead. The screen is set at 212 lines per inch. Due to the 4-bit printhead employed, the theoretical number of gray levels is 121. The rendering algorithm employed is one that divides the halftone cell into 8 pixels, each of which has a state of from 1 to 15. The algorithm builds dots by activating pixel 1 first for steps 1–12, then pixel 2 for steps 1–12, then pixel 3 for steps 1–12, and so on until all 8 pixels are at state 12. For state 13, the rendering algorithm turns on each pixel one at a time, until all 8 pixels are at state 13. For state 14, the algorithm turns on each pixel one at a time, until all 8 pixels are at state 14. Similarly, for state 15, the rendering algorithm turns on each pixel one at a time, until all 8 pixels are at state 15. Thus, the result is that the screen is effectively at a low frequency for states 1–12, while it is shifted to a high frequency for states 13–15. As is evident from FIG. 10, the plot shows a curve which is nearly at a 45 degree angle, and the delta with respect to density between each step is substantially less than for the plots shown in the comparative examples above. There are also no significant increases between steps at the lower end of the curve, i.e., in the "toe" area, while the upper portion of the curve does not display any blocking or saturation at the shoulder to any significant extent. The result is a much more visually pleasing image to the human eye.

What is claimed is:

1. A method for generating variable density halftone images with electrography comprising the steps of:

grouping sets of adjacent pixels into a set of adjacent cells where each cell corresponds to a halftone dot of an image;

selectively setting exposure levels for a gray scale writer to grow halftone dots from zero size to a desired size equal to or less than a maximum size by increasing exposure of one pixel in the cell one exposure level at a time until the pixel reaches a first total level of exposure and selectively repeating this step for the rest of the pixels until the cell is at its desired size and at an initial density;

selectively adjusting exposure of the initial density of cells at the maximum size by sequentially increasing the level of exposure of each pixel in the maximum size cell by one exposure level at a time for each pixel until all pixels are at the same next level of exposure and then repeating this step to further increase the density of the cell to desired density;

discharging areas of a charged image member in accordance with the selected levels of exposure of the prior steps to form a latent image of variable density halftone dots on the image member;

enclosing a cylindrical magnetic roller in a concentric sleeve;

rotating the magnetic roller in a first direction;

disposing the magnetic roller and the sleeve in a container holding a two-component toner comprising hard magnetic carrier particles and toner particles;

rotating the concentric sleeve in a direction opposite to the direction of the magnetic roller and in a direction co-current with an imaging member;

contacting the sleeve and the latent image on the image member;

transferring toner particles from the sleeve to the latent image to develop the latent image;

transferring the developed image to a copy sheet;

fixing the developed image on the copy sheet.

2. The method of claim 1 wherein the step of selectively growing halftone dots from zero size to a desired size equal to or less than a maximum size includes increasing the desired exposure of a first pixel in a plurality of discrete steps until the first pixel in the cell reaches the maximum level of exposure and then repeating the stepwise exposure increase for each pixel in the cell until all pixels in the cell are at the maximum level of exposure.

3. The method of claim 1 wherein the step of selectively adjusting the density of a maximum sized cell includes sequentially raising each pixel in the cell one level at a time to a second maximum for each pixel.

4. An electrographic print engine for printing variable density halftone images comprising:

a controller for grouping sets of adjacent pixels into a set of adjacent cells where each cell corresponds to a halftone dot of an image;

selectively growing halftone dots from zero size to a desired size equal to or less than a maximum size by increasing exposure of one pixel in the cell until the pixel reaches a first level of exposure and repeating this step for the rest of the pixels until the cell is at its desired size and at an initial density;

selectively adjusting the initial density of cells at the maximum size by sequentially increasing the level of exposure of each pixel in the cell one level at a time for each pixel until all pixels are at the next level of exposure and then repeating this step to further increase the density of the cell to desired density;

a gray scale writer having an array of light emitting diodes for discharging areas of a charged image member in accordance with the selected levels of exposure of the prior steps to form a latent image of variable density halftone dots on the image member;

a toner station including a container holding a two-component developer comprising hard magnetic carrier particles and toner particles, a cylindrical magnetic roller with a concentric sleeve covering the magnetic roller and one or more motors for rotating the magnetic roller in a first direction and the sleeve in the opposite direction;

an image member for receiving a uniform charge, travelling along a path proximate the gray scale writer for exposure to create a latent image and past the developer station to develop the latent image;

a transfer station proximate the image member for transferring the developed image to a copy sheet;

a fusing station for receiving the copy sheet with the transferred developed image and fixing the developed image to the copy sheet.

5. A method for the generation of halftoned images with reduced image artifacts and increased number of gray levels, the method comprising:

capturing a desired image in a raster format comprising a plurality of pixels with multiple bits per pixel, thereby producing a digital signal of the desired image;

manipulating the digital signals with a rendering means capable of printing variable halftone dot sizes and densities so as to produce a manipulated halftone signal, said manipulating comprising building a cell comprising a central pixel or set of central pixels and a set of peripheral pixels spaced from the center by increasing the density of the pixels closest to the center of the cell before increasing the density of the peripheral pixels;

exposing a photoconductive surface with the manipulated halftone signal so as to create a halftone electrostatic image of the original image; and contacting an electrostatic image with a rotating magnetic brush development station comprising a developer composition comprised of a hard magnetic carrier and a toner.

6. An apparatus for the electrographic generation of halftoned images, which apparatus comprises a multi-bit printhead, means for generating a halftone image of varying dot sizes and densities, including a cell comprising a central pixel or set of central pixels and a set of peripheral pixels spaced from the center, means for increasing the density of the pixels closest to the center of the cell before increasing the density of the peripheral pixels, and a rotating magnetic brush development system comprising a developer composition comprised of a hard magnetic carrier and a toner.

7. A method for the generation of halftoned images with reduced image artifacts and increased number of gray levels, the method comprising:

capturing a desired image in a raster format comprising a plurality of pixels with multiple bits per pixel, thereby producing a digital signal of the desired image;

manipulating the digital signals with a rendering means capable of printing variable halftone dot sizes and densities so as to produce a manipulated halftone signal, said manipulating comprising selecting a first pixel at or near the center of the cell and increasing its density in a plurality of steps until the first pixel reaches a first maximum density;

selecting a second pixel having one side adjacent the first pixel and increasing the density of the second pixel in a plurality of steps until the second pixel reaches the first maximum density; and reiterating the steps of selecting a pixel having one side adjacent a pixel at the first maximum density and increasing the density of the selected pixel until the selected pixel is at the first maximum density, until the cell is at a desired density or all the pixels in the cell are at the first maximum density so that the cell is increased first in density in its central region and later is increased in size in order to generate a half tone image;

exposing a photoconductive surface with the manipulated halftone signal so as to create a halftone electrostatic image of the original image; and contacting an electrostatic image with a rotating magnetic brush development station comprising a developer composition comprised of a hard magnetic carrier and a toner.

8. An apparatus for generating halftoned images with reduced image artifacts and increased number of gray levels, comprising:

means for capturing a desired image in a raster format comprising a plurality of pixels with multiple bits per pixel, thereby producing a digital signal of the desired image;

means for manipulating the digital signals with a rendering means capable of printing variable halftone dot sizes and densities so as to produce a manipulated halftone signal, said manipulating comprising means for selecting a first pixel at or near the center of the cell and increasing its density in a plurality of steps until the first pixel reaches a first maximum density;

means for selecting a second pixel having one side adjacent the first pixel and increasing the density of the second pixel in a plurality of steps until the second pixel reaches the first maximum density; and means for reiterating the steps of selecting a pixel having one side adjacent a pixel at the first maximum density and increasing the density of the selected pixel until the selected pixel is at the first maximum density, until the cell is at a desired density or all the pixels in the cell are at the first maximum density so that the cell is increased first in density in its central region and later is increased in size in order to generate a half tone image;

means for exposing a photoconductive surface with the manipulated halftone signal so as to create a halftone electrostatic image of the original image; and means for contacting an electrostatic image with a rotating magnetic brush development station comprising a developer composition comprised of a hard magnetic carrier and a toner.

9. An electrographic print engine for printing variable density halftone images comprising:

means for grouping sets of adjacent pixels into a set of adjacent cells where each cell corresponds to a halftone dot of an image;

means for selectively setting exposure levels and comprises a plurality of pixels for a first pixel at or near the center of a cell until the cell is at a desired density or the first pixel is at a first maximum density;

means for selectively setting exposure levels for a second pixel adjacent the first pixel until the cell is at a desired density or until the second pixel is at a first maximum density; and means for selectively setting exposure levels of further pixels in the cell in the same manner as the first and second pixel so that each subsequent pixel is adjacent to the last pixel adjusted;

means for discharging areas of a charged image member in accordance with the selected levels of exposure of the prior steps to form a latent image of variable density halftone dots on the image member;

means for enclosing a cylindrical magnetic roller in a concentric sleeve;

means for rotating the magnetic roller in a first direction;

means for disposing the magnetic roller and the sleeve in a container holding a two-component developer comprising hard magnetic carrier particles and toner particles means for rotating the concentric sleeve in a direction opposite to the directions of the magnetic roller and in a direction co-current with an imaging member;

means for contacting the sleeve and the latent image on the image member;

means for transferring toner particles from the sleeve to the latent image to develop the latent image;

means for transferring the developed image to a copy sheet;

means for fixing the developed image on the copy sheet.

10. The electrographic print engine for printing variable density halftone images of claim 9 wherein the means for selectively setting exposure levels of pixels in a cell includes means for increasing the desired exposure of a first pixel in a plurality of discrete steps until the first pixel in the cell reaches a maximum cumulative level of exposure and means for selectively repeating the stepwise exposure increase for each pixel in the cell until the cell is at its desired cumulative level of exposure.

11. The electrographic print engine of claim 9 wherein the means for selectively adjusting the exposure of pixels in a cell includes means for sequentially raising the desired exposure of each pixel in the cell one level at a time until the cell reaches the desired density and all the pixels in the cell reach a second cumulative maximum level.

12. The electrographic print engine of claim 9 wherein the means for discharging the image member comprises an array of light emitting diodes for exposing the pixels of the image member, a gradient index lens for focusing the light from the diodes onto the image member, and a control circuit for energizing the diodes at a common level of intensity and for a duration of time in accordance with the desired exposure level for each pixel.

13. The electrographic print engine of claim 9 further comprising a pulse width modulating circuit coupled to the print array for applying a voltage of one value to all the light emitting diodes for a duration of time determined by the width of a timing pulse.

14. The electrographic print engine of claim 9 wherein the means for discharging the image members comprises a scanning laser for exposing each pixel in accordance with the desired level of exposure.

15. A method for generating variable density halftone images with electrography comprising the steps of:

dividing a latent image into a plurality of cells, where each cell comprises a plurality of pixels;

in a cell, adjusting the density of a first pixel by changing its density in a series of steps until the cell is at a desired density or the pixel is at a first maximum density;

if the first pixel is at the first maximum density and cell is not at the desired density, then adjusting the density a second pixel until the cell has the desired density or all the second pixel is at the first maximum density; and if the cell is not at the desired density after the second pixel is at the first maximum density, then repeating the last two steps for each remaining pixel until all the cell is at the desire density or all the pixels are at the first maximum density; and if the cell is not at the desired density after all the pixels are at the first maximum density, establish a second maximum density greater than the first maximum density and repeat the last three steps as many times as required until the cell has the desired density.

16. The method of claim 15 wherein the first cell is at or near the center of the cell.

17. The method of claim 15 wherein the second cell is adjacent the first cell also proximate the center.

18. The method of claim 15 wherein the subsequent cells are as close as possible to the center and adjacent at least one of the prior cell that are at the maximum density.

19. A method for generating variable density halftone images with electrography comprising the steps of:

dividing a latent image into a plurality of cells, where each cell comprises a plurality of pixels;

adjusting the pixels one at a time until the cell reaches a target density or all the pixels are at a first maximum density, said pixels selected in their order along a spiral-like path that travels in a first direction originating at or near the center of a cell and extending circumferentially about the center of the cell until a first set of pixels is at the first maximum density and then around the first set of pixels in a similar spiral-like path until all the pixels in the pixels in the cell are at the first maximum density.

20. A method for generating variable density halftone images with electrography comprising the steps of:

dividing a latent image into a plurality of cells, where each cell comprises a plurality of pixels;

adjusting pixels in a cell one at a time along a spiral-like path starting at or near the center of the cell and proceeding around the center of the cell and then outward so as to build the cell from the center outward until the cell is at a desired density or all the pixels are at a first maximum density; and if the cell is not at its desired density, repeating the adjusting steps as many times as needed for increasing greater maximum densities until the cell is at the desired density.

21. An electrographic print engine for printing variable density halftone images comprising:

a controller for grouping sets of adjacent pixels into a set of adjacent cells where each cell corresponds to a halftone dot of an image; and for selectively growing halftone dots from zero size to a desired size equal to or less than a maximum size adjusting the pixels one at a time until the cell reaches a target density or all the pixels are at a first maximum density, said pixels selected in their order along a spiral-like path that begins at or near the center of the cell and travels in a first direction circumferentially about the center of the cell until a first set of pixels is at the first maximum density and then around the first set of pixels in a similar spiral-like path until all the pixels in the pixels in the cell are at the first maximum density;

a gray scale writer having an array of light emitting diodes for discharging areas of a charged image member in accordance with the selected levels of exposure of the prior steps to form a latent image of variable density halftone dots on the image member;

a toner station including a container holding a two-component developer comprising hard magnetic carrier particles and toner particles, a cylindrical magnetic roller with a concentric sleeve covering the magnetic roller and one or more motors for rotating the magnetic roller in a first direction and the sleeve in the opposite direction;

an image member for receiving a uniform charge, traveling along a path proximate the gray scale wrier for exposure to create a latent image and past the developer station to develop the latent image;

a transfer station proximate the image member for transferring the developed image to a copy sheet;

a fusing station for receiving the copy sheet with the transferred developed image and fixing the developed image to the copy sheet.

\* \* \* \* \*